United States Patent
Betin et al.

(10) Patent No.: US 8,000,362 B2
(45) Date of Patent: Aug. 16, 2011

(54) SOLID-STATE SUSPENSION LASER GENERATION UTILIZING SEPARATE EXCITATION AND EXTRACTION

(75) Inventors: Alexander A. Betin, Manhattan Beach, CA (US); Kalin Spariosu, Thousand Oaks, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 12/592,232

(22) Filed: Nov. 20, 2009

(65) Prior Publication Data
US 2010/0150191 A1     Jun. 17, 2010

Related U.S. Application Data

(62) Division of application No. 11/804,804, filed on May 21, 2007, now Pat. No. 7,646,796, and a division of application No. 10/915,229, filed on Aug. 10, 2004, now abandoned.

(51) Int. Cl.
*H01S 3/14* (2006.01)
*H01S 3/17* (2006.01)
*H01S 3/20* (2006.01)
(52) U.S. Cl. ............... 372/40; 372/51; 372/68
(58) Field of Classification Search .......... 372/51, 372/52, 53, 54, 40, 68
See application file for complete search history.

(56) References Cited

U.S. PATENT DOCUMENTS

| 4,742,524 A | 5/1988 | Muller |
| 4,853,937 A | 8/1989 | Rinke |
| 6,034,979 A * | 3/2000 | Karube et al. ............... 372/39 |
| 6,154,478 A * | 11/2000 | Vetrovec ...................... 372/89 |
| 2003/0161364 A1 | 8/2003 | Perry |

FOREIGN PATENT DOCUMENTS

| EP | 0877453 A | 11/1998 |
| JP | 03116794 A | 5/1991 |

OTHER PUBLICATIONS

Stefanov, V. J., "Laser with two-phase active medium", Infrared Physics, vol. 29 No. 2-4, May 1989, pp. 381-384.

* cited by examiner

*Primary Examiner* — Jessica T Stultz
*Assistant Examiner* — Marcia A Golub-Miller
(74) *Attorney, Agent, or Firm* — Pillsbury Winthrop Shaw Pittman LLP

(57) ABSTRACT

A solid-state suspension laser. The novel laser includes a gain medium comprised of a plurality of solid-state gain particles suspended in a fluid. The laser also includes a pump source for pumping the gain particles and a resonator for amplifying and outputting laser light generated by the gain medium. In an illustrative embodiment, the gain medium is adapted to flow, and the pumping of the gain medium occurs outside of the resonator. The flow velocities and the densities of the gain particles in the gain medium can be optimized for optimal absorption efficiency during the pumping and/or for optimal extraction efficiency in the resonator as well as for overall laser performance optimization, including power, efficiency and beam quality scalability.

8 Claims, 4 Drawing Sheets

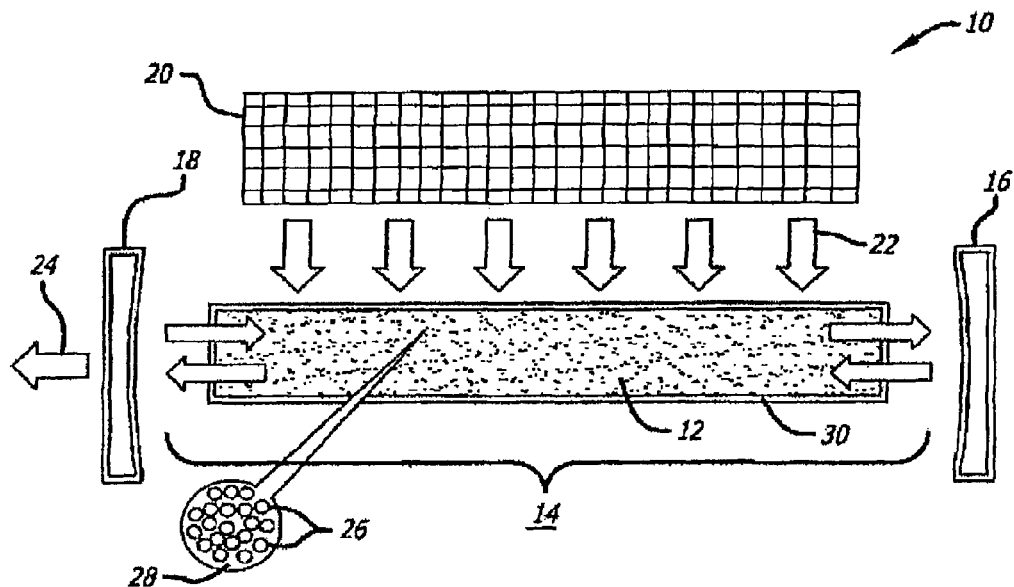
FIG. 1 (CONVENTIONAL)

SOLID-STATE SUSPENSION LASER GENERATION UTILIZING SEPARATE EXCITATION AND EXTRACTION

This Application is a Divisional Application of U.S. patent application Ser. No. 11/804,804, filed May 21, 2007 now U.S. Pat. No. 7,646,796 by Alexander A. Betin et al., and is hereby incorporated by reference herein in its entirety, and a Divisional of U.S. patent application Ser. No. 10/915,229, entitled SOLID-STATE SUSPENSION LASER filed Aug. 10, 2004 now abandoned by Alexander A. Betin et al., the teachings of which are incorporated herein by reference.

BACKGROUND OF THE INVENTION

1. Field of the Invention

The present invention relates to optical systems. More specifically, the present invention relates to solid-state lasers.

2. Description of the Related Art

Weapon-class lasers are required to have the highest possible power per weight ratio in order to fulfill requirements for a variety of airborne and ground tactical applications. The implementation of a high-energy weapon-class laser system is currently limited to large platforms due to the relatively low power per weight ratio numbers in the present approaches.

Prior attempts to implement a weapons class laser range from the chemical laser to the diode-pumped solid-state power oscillator (PO). The chemical laser is a highly complex system and typically takes up a good portion of the available real estate in an aircraft. In addition, the chemical handling makes this an extremely cumbersome and undesirable approach. The relatively clean diode-pumped solid-state laser approach is much more desirable.

Solid-state lasers, however, have their share of problems. These devices typically require active (or passive) phase conjugation techniques to compensate for high beam distortion generated as the laser propagates through the amplifier chain. In addition, the gain elements themselves are currently comprised of complex, composite slabs that are very expensive and prone to damage. Large size solid-state laser active media are required for power/energy scaling of laser systems, but such media is difficult to fabricate. The number of potential materials for the gain medium is also reduced, since some materials cannot be grown to the sizes needed for a high-energy laser. Furthermore, the large size of the gain medium makes it harder for thermal management to extract heat out of the medium. The large gain medium also makes it more difficult to control optical uniformity, making it harder to control laser beam quality. Finally, the MOPA approach limits the ultimate optical (and, therefore, the overall) conversion efficiency, which results in increased power and wastes heat extraction real estate.

One high-energy solid-state PO laser is the multiple disk heat capacity laser. This laser uses multiple disks of smaller size gain media instead of a single, large bulk medium. Thermal management, however, remains a problem for this approach. The laser can only operate for a few seconds before it needs to be cooled. The smaller gain media disks are faster to cool than a single bulk medium, but several minutes could still be needed for cooling before the laser can be reactivated. In addition, pumping for the multiple disk laser can be difficult to arrange.

Another solid-state approach is the fiber laser. Fiber lasers have inherently high efficiencies because they allow for 100% pump power absorption and operate at very high laser intensity, and can be cooled efficiently due to their inherently high surface to volume ratio. Fiber lasers, however, are ultimately limited by the maximum power at which they can operate due to intensity damage threshold limits. In order to generate higher powers, several fibers need to be combined. This, however, requires phasing of multiple fiber oscillators, which adds a number of problems (not satisfactorily solved yet) and associated complexities.

Hence, a need exists in the art for an improved solid-state laser that is scalable for high energy and power, and that offers better optical quality, easier fabrication, and improved thermal management than conventional approaches.

SUMMARY OF THE INVENTION

The need in the art is addressed by the solid-state suspension laser of the present invention. The novel laser includes a gain medium comprised of a plurality of solid-state gain particles suspended in a fluid.

In the illustrative embodiment, the laser also includes a pump source for pumping the gain particles and a resonator for amplifying and outputting laser light generated by the gain medium. In an illustrative embodiment, the gain medium is adapted to flow, and the pumping of the gain medium occurs outside of the resonator. The flow velocities and the densities of the gain particles in the gain medium can be optimized for optimal absorption efficiency during the pumping and/or for optimal extraction efficiency in the resonator as well as for overall laser performance optimization, including power, efficiency and beam quality scalability.

BRIEF DESCRIPTION OF THE DRAWINGS

FIG. 1 is a simplified schematic of an illustrative embodiment of a laser designed in accordance with the teachings of the present invention.

DESCRIPTION OF THE INVENTION

Figure 2:
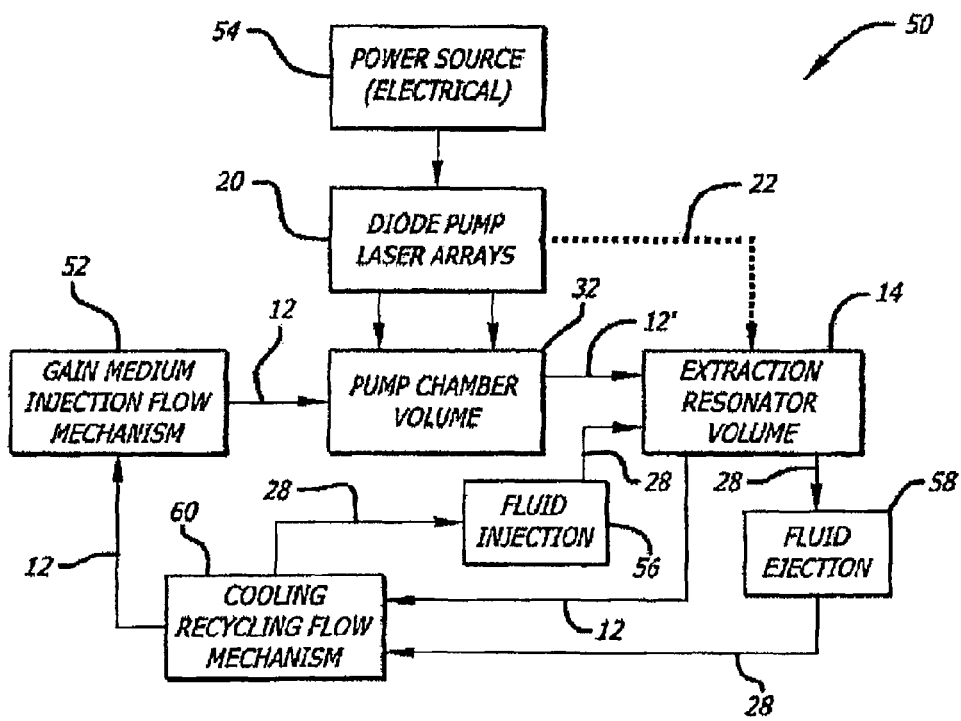
FIG. 2 is a simplified block diagram of an illustrative embodiment of a laser system designed in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As is well known in the art, a laser typically includes a gain medium disposed in a resonator, and a pump source. The gain medium is excited to a higher energy state by the pump source, and the resultant emitted light is bounced back and forth within the resonator, triggering further stimulated emissions. The laser gain medium can be a solid-state, liquid, gas, or semiconductor. The present invention relates to solid-state lasers. Solid-state lasers typically use a gain medium that is comprised of active lasing ions distributed in a solid matrix (a crystalline or glass host material). Common solid-state media include Nd:YAG (neodymium doped yttrium-aluminum-garnet), Yb:YAG (ytterbium doped yttrium-aluminum-garnet), Nd:glass (neodymium doped glass), Er:glass (erbium doped glass), Yb:glass (ytterbium doped glass), and others. A conventional solid-state gain medium is usually in the form of a solid rod of doped glass or crystal. In contrast, the novel laser of the present invention uses a lasing medium comprised of a plurality of solid-state gain particles suspended in a fluid host.

FIG. 1 is a simplified schematic of an illustrative embodiment of a laser 10 designed in accordance with the teachings of the present invention. The laser 10 includes a gain medium 12 disposed in a resonator 14 formed by a mirror 16 and an output coupler 18 (a partially reflective mirror), and a pump source 20, which generates optical energy 22 for pumping the gain medium 12. The optical output 24 generated by the gain medium 12 bounces back and forth between the two mirrors 16 and 18, and exits through the output coupler 18.

In addition, since the laser gain medium is now comprised of a large number of small particles, the gain surface area becomes very large relative to the volume. The much higher (orders of magnitude compared to bulk media) surface area to volume ratio in the lasing volume greatly improves waste heat removal and thermal management, which may also lead to relaxed cooling support infrastructure requirements (reduced weight and volume).

The solid-state gain particles 26 are suspended in a fluid host 28. The fluid 28 can be any material capable of suspending the particles 26, and capable of transmitting the pump radiation 22 and the laser energy 24 (i.e., optically transparent). The host fluid 28 may be a cryogenically cooled liquid to help with thermal management and improvement of overall laser performance. In an illustrative embodiment, the fluid 28 is a liquid host having a refractive index matching that of the gain particles 26. Note that although the gain particles 26 may be suspended in a liquid host 28, the gain medium itself is solid-state, not liquid. The fluid 28 acts as an inactive host, while the pumping and laser energy extraction occurs in the solid-state gain particles 26. Therefore, solid-state laser physics apply.

While the gain medium of the particles 26 can be of any lasing material, some solid-state hosts provide for more favorable laser physics properties and refractive indices for matching to robust, available index-matching fluids. Consider as an example an Yb or Er doped solid-state host. The table below lists potential solid-state hosts for Er or Yb gain ions and corresponding index matching suspension fluid candidates:

| Solid-state host material | Matching liquid index of refraction | Manufacturer | Catalog Number | Description | Properties |
|---|---|---|---|---|---|
| glass (n~1.55) | 1.53-1.56 | Cargille | 20150-20190 | Laser index matching liquid | Mineral oil class, non-toxic, operation: 20-150° F. |
| YAG (n~1.82) | 1.81-2.0 | Cargille | 18181 | Laser index matching liquid | Contains arsenic tribromide (or disulfide) - toxic, operation: 65-105° F. |
| MgF$_2$ (n~1.38) | 1.34 | | | D$_2$O | Robust inert liquid |

In accordance with the present teachings, the gain medium 12 is comprised of a plurality of solid-state gain particles 26 suspended in a fluid 28. The suspension gain medium 12 may be held within a container 30 formed from an optically transparent material, such as glass. The gain particles 26 can be fabricated from any material capable of lasing, including conventional solid-state gain media such as Er:glass, Yb:glass, Nd:glass, Nd:YAG, Yb:YAG, and others. In an illustrative embodiment, the particles 26 are solid-state micro-sphere gain elements (the particles 26 can actually be of any arbitrary shape without departing from the scope of the present teachings), having diameters on the order of microns (or smaller) to millimeters. The small individual micro-sphere gain element size greatly relaxes the manufacturing requirements for fabricating a laser gain medium, leading the way towards high energy laser scaling. This also greatly expands the range of laser active medium materials that can be used in the fabrication process; non-traditional gain host media such as less robust crystals (MgF$_2$, CaF$_2$, BaF$_2$, etc., for example) can be utilized. Low thermal conductivity laser active media, such as based on glass materials, can be used. Ceramics materials can be used as well.

As can be noted, there are a variety of solid-state gain host/suspension fluid combinations that can be employed for this implementation. The glass-based approach can leverage the maturity of the fiber optics and fiber laser technology as well as the availability of relatively robust index-matching liquids. The refractive index, n, of glass can be tailored or controlled with an accuracy of $\Delta n < 10^{-4}$, using technologies developed for fiber-optic products. The Er: and Yb: glass laser gain media have favorable properties for implementation in the laser system of the present invention. Manufacturability of fibers as well as micro-spheres from this material is well established. In addition, pump diode sources as well as proper index matching liquids are available for this solid-state host. The resonantly pumped Yb:glass (or Er:glass) laser also provides for a low quantum defect efficient laser (less energy is wasted in the transition between pump absorption and laser extraction, which minimizes the heat load). The refractive index match can be tailored and maintained by varying and controlling the operating temperature due to refractive index temperature dependence. For instance, several degrees in temperature change may lead to about $10^{-3}$ change in refractive index of liquid.

The illustrative embodiment shown in FIG. 1 is a simple example where the gain medium 12 stays within the resonator 14 and is pumped within the resonator 14, as with a conventional bulk solid-state laser. Other options, however, are now available since the gain medium 12 is now suspended in fluid. For example, the suspension fluid can be adapted to flow, providing for dynamic flow/cycling for efficient heat management even at very high, multi-kilowatt power levels. The suspension fluid therefore doubles as a dynamic transport medium and cooling interface. The implementation of a dynamic solid-state micro-sphere suspension liquid transport and control removes the need for cumbersome, complex liquid cooling infrastructures, which otherwise add weight, cost and complexity to the overall system. Another available option is to pump the gain medium outside of the resonator region and then flow the suspension gain medium through the resonator where lasing occurs and pumped stored energy is extracted.

Figure 3A:
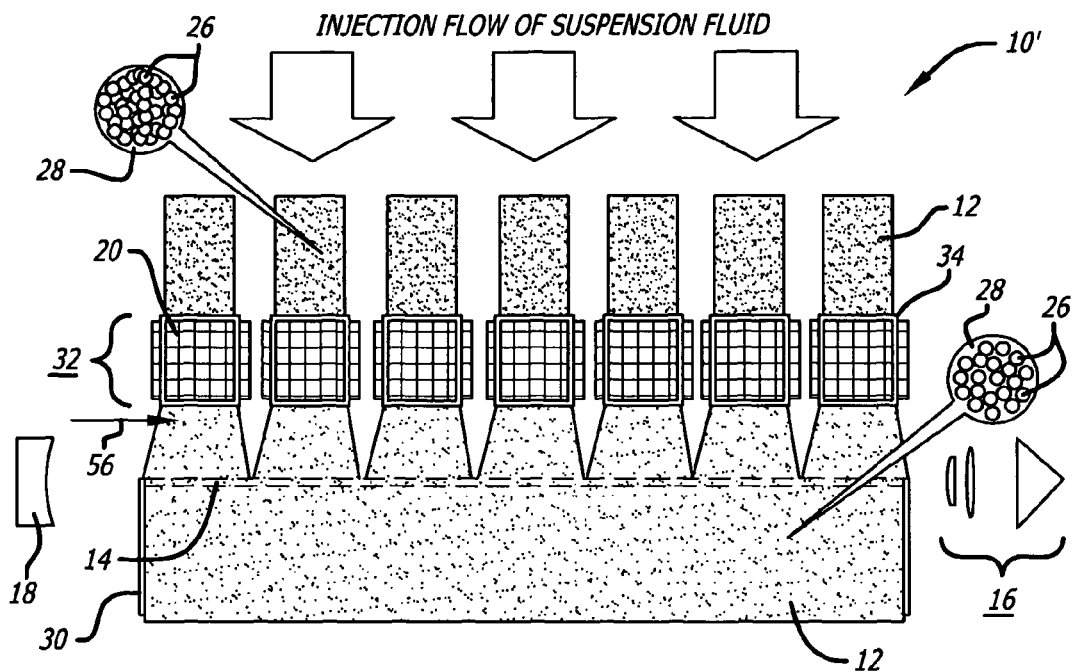
FIG. 3a is a side view of an illustrative embodiment of a laser with separate pump and resonator regions designed in accordance with the teachings of the present invention.
Figure 3B:
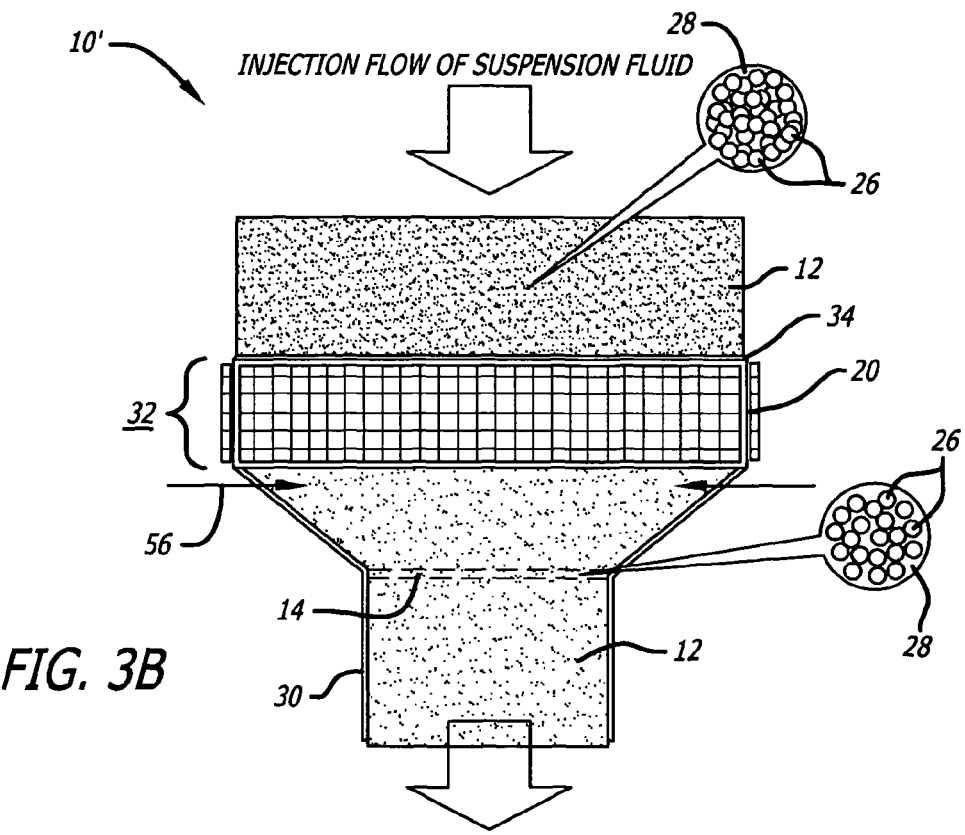
FIG. 3b is an end view of an illustrative embodiment of a laser with separate pump and resonator regions designed in accordance with the teachings of the present invention.

FIG. 2 is a simplified block diagram of an illustrative embodiment of a laser system 50 designed in accordance with the teachings of the present invention. The system 50 includes an injection flow mechanism 52 adapted to inject the suspension gain medium 12 into a pump region 32. The pump source 20, which in this embodiment can be an array of diode lasers driven by an electrical power source 54, is adapted to pump the gain medium 12 in the pump region 32. The pumped gain medium 12' then flows to the resonator (extraction region) 14. The pump region 32 and resonator region 14 may occupy the same space (as in the embodiment of FIG. 1), or they may be separate (as shown in the embodiments of FIGS. 3a and 3b). By separating the pump region 32 and the resonator region 14, the density of gain particles in the suspension gain medium 12 can be controlled to optimize absorption efficiency in the pump region 32, and then adjusted to optimize extraction efficiency in the resonator region 32. For this embodiment, the laser system 50 also includes a fluid injection mechanism 56 for adding fluid 28 to the suspension gain medium 12 (decreasing the density of gain particles) before entering the resonator 14, and a fluid ejection mechanism 58 for removing fluid 28 from the suspension gain medium 12 (increasing the density of gain particles) after the resonator 14 (before entering the pump region 32). The gain medium 12 flows out of the resonator 14 to a cooling and recycling mechanism 60, which cools the gain medium 12 and returns it to the injection flow mechanism 52.

FIGS. 3a and 3b are simplified schematics of an illustrative embodiment of a laser 10' with separate pump and resonator regions designed in accordance with the teachings of the present invention. FIG. 3a shows a side view and FIG. 3b shows an end view. In the illustrative embodiment, the pump region 32 is formed from a bank of pump modules 34 for containing the laser active doped solid-state micro-sphere suspension 12 as it is pumped by a diode laser array pump bank 20. The suspension gain medium 12 then flows out of the pump modules 34 into a single resonator chamber 14, as formed by the walls of a container 30. The gain medium 12 is flowed through the pump region 32 with controlled velocities for optimized pumping and can also be shaped for optimized absorption efficiency. The flow velocity and micro-sphere density of the gain medium 12 through the resonator extraction volume 14 is then optimized for the most efficient extraction efficiency. The shape of the resonator chamber 14 can also be tailored to geometrically match the laser resonator mode for efficient energy conversion and reduced parasitic losses, and to incorporate image rotating designs for compensation of non-uniform gain depletion and optical distortions (if any) in the laser resonator cross-section, which is along the direction of the flow (this may be less needful if the pump and resonator regions overlap). In the illustrative embodiment, the resonator region 14 (the active lasing volume) is very thin in the cross-flow direction and has a large aspect ratio (about 10:1) in cross-sectional area to reduce non-uniformities in gain medium density and increase power scalability. The length of the resonator region 14 in the cross-flow direction should be as thin as possible (nominally on the order of about 1 cm) to keep the flow velocity at a reasonable (desired) rate. The longer the cross-flow dimension, the faster the flow velocity would need to be in order to achieve a desired transit time. In the illustrative embodiment, the resonator region 14 has dimensions of approximately 1 cm×10 cm×100 cm, the smallest dimension being in the cross-flow direction. However, those of ordinary skill in the art will appreciate that the dimensions of the resonator region 14 may vary without departing from the scope of the present teachings.

In the illustrative embodiment shown in FIGS. 3a and 3b, the gain medium 12 has a higher density in the pump region 32 for optimized absorption. After the pump region 32, the fluid injection mechanism 56 adds fluid 28 at a controlled rate to the gain medium 12 for optimized micro-sphere density for high extraction efficiency in the resonator 14. If desired for performance improvement, it can also be done in the opposite way: first ejection and then injection of the fluid.

Figure 4:
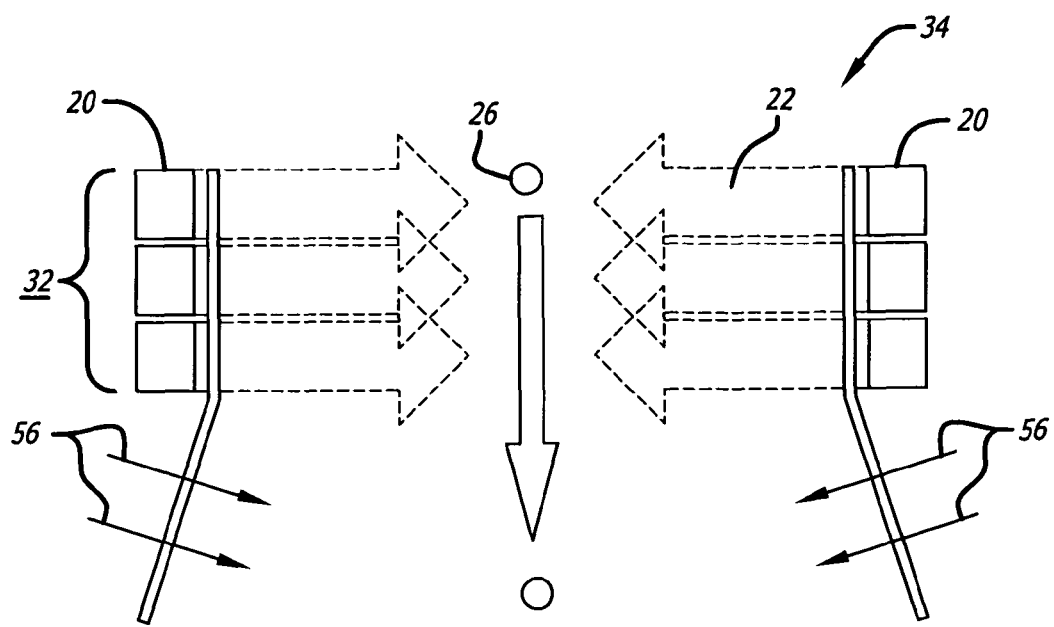
FIG. 4 is a cross-sectional view of a pump module for a laser designed in accordance with the teachings of the present invention.

FIG. 4 is a cross-sectional view of a pump module 34 for a laser 10' designed in accordance with the teachings of the present invention. In the pump region 32, the pump sources 20 apply optical energy 22 to the gain particles 26. In the illustrative embodiment, the optical energy 22 is applied in a direction orthogonal to the flow direction. Other geometries, however, may be used without departing from the scope of the present teachings. Flow velocity control and density tailoring for optimized absorption efficiency in the pump bank modules 34 is allowed by the orthogonal nature of this illustrative pumping and lasing volume implementation. The density of the micro-sphere suspension is optimized via fluid injection and controlled velocity of flow. The flow velocity is also optimized for most efficient pumping and laser energy extraction in the lasing volume. The flow velocity across the resonator dimension 14 can be optimized by changing the gain medium volume (via the shapes of the pump modules 32 and resonator container 30).

This remote pumping approach allows for efficient conformal geometrical matching to the pump source layout such that both the absorption efficiency as well as the transit time can be optimized. Because of the decoupled pump geometry (from the laser resonator 14), a much relaxed cooling implementation of the diode pump sources 20 can be effected. The mean transit time across the pump radiation field 32 and to and through the resonator 14 should be less than the fluorescence lifetime of the upper laser level (ideally, about $\frac{1}{5}^{th}$ the fluorescence lifetime). The capability of allowing almost free reign in the geometrical layout of the pump diode sources 20 allows the implementation of a single master resonator approach. This eliminates the need for amplifier chains that usually reduce efficiency and adds complexities to a laser system.

This implementation allows for reasonable mean fluid transport velocities even for a multi-kilowatt class laser. The most relaxed requirements can be anticipated for the laser materials with longer fluorescence radiation lifetimes, like Er:glass for instance, which has $\tau \approx 8$ msec. Assuming that the suspension gain medium travel time through a resonator cannot be more than $\tau/10$ in order to avoid the loss of stored laser energy from the pumped upper laser level, then a rough estimate of the laser output power $P_{out}$ can be made using a simplified formula given by:

$$P_{out} \approx I_{out}(D_y/D_x)(\tau/10)v^2 \quad [1]$$

where $I_{out}$ is the output laser beam intensity (the higher the better for good extraction efficiency, typically not higher than 100 kW/cm$^2$ to exclude optical damage), $D_y/D_x$ is the aspect ratio (width to thickness; it is equal to or greater than one) of the rectangular (preferable geometry from a performance point of view) cross section of the gain medium geometry within a laser resonator, and v is the flow velocity. Using Eqn. 1 in the case of an Er:glass laser, it is estimated that close to 100 kW of output power can be realized with flow velocities of about 1 m/s and aspect ratios greater than 10. This flow velocity is sufficient enough so the temperature rise in the gain medium caused by the generated heat inside due to lasing is minimal.

It is interesting to estimate the power $P_{kin}$ related to the kinetic motion of the suspension gain medium and compare it to the output power $P_{out}$, using the estimating formula:

$$P_{kin} \approx (1/2)(D_y/D_x)(\tau/10)L\rho v^4 \quad [2]$$

where L is the length of the gain medium in the resonator and ρ is the average density of the suspension medium. For flow velocities about or less than 1 m/s, $P_{kin}$ is negligible (less than 0.1%) of the $P_{out}$ values. But it is worth noting that $P_{kin}$ grows much faster than $P_{out}$ if the velocity increases.

For other laser materials with relatively short fluorescence lifetimes, like Nd:glass or Yb:glass where they are ~0.3 ms and ~1 ms, respectively, this remote pumping approach may not be as favorable, especially when desired output power is high. In this case, the approach where the pumping and resonator regions are overlapped may be preferable. Of course, the suspension gain medium flows in this case as well. In general, this approach may lead to very high output powers and one of the limiting factors here is a temperature rise in the gain medium, which depends on flow rate also. The following estimating formula can be used to assess the relation between the mass flow rate and the temperature rise:

$$dm/dt \cdot P_{out}(\eta_h/\eta_{extr})/(C\Delta T) \quad [3]$$

where dm/dt is the gain medium mass flow rate; $\eta_h$ and $\eta_{extr}$ are heat fraction and lasing extraction efficiency, respectively, relative to the stored lasing power within the gain medium; C is the heat capacity of the suspension; and $\Delta T$ is the temperature rise. This formula was derived assuming that the thermal time constant of heat transfer from particles to the fluid is short relative to the transport time through the resonator region during lasing. A simple estimate for spherical particles gives an estimate of thermal time value $t_{th} \sim (\rho C\, d^2)/(24\, k)$, where the additional parameter k is thermal conductivity. For glass (k~1.4×10$^{-2}$ W/cm° K., (ρ C)~1.8 J/cm$^3$ ° K.), $t_{th}$ is about 5×10$^{-6}$ sec for a particle diameter of d~10 μm, which is certainly very small compared to fluorescence life time and possible fluid transport time. This analysis is for the worst case scenario where the host material is glass, which has a poor thermal diffusivity. In the case of any crystal host, the temperature diffusivity time is shorter. The estimate of dm/t shows that even for ~100 kW of output power and typical parameters (like C~1 J/g ° K., $\eta_h$~0.1, $\eta_{extr}$~0.5, and $\Delta T$~20° K.) the required mass flow rate is very reasonable: dm/dt~1 kg/s.

Figure 5:
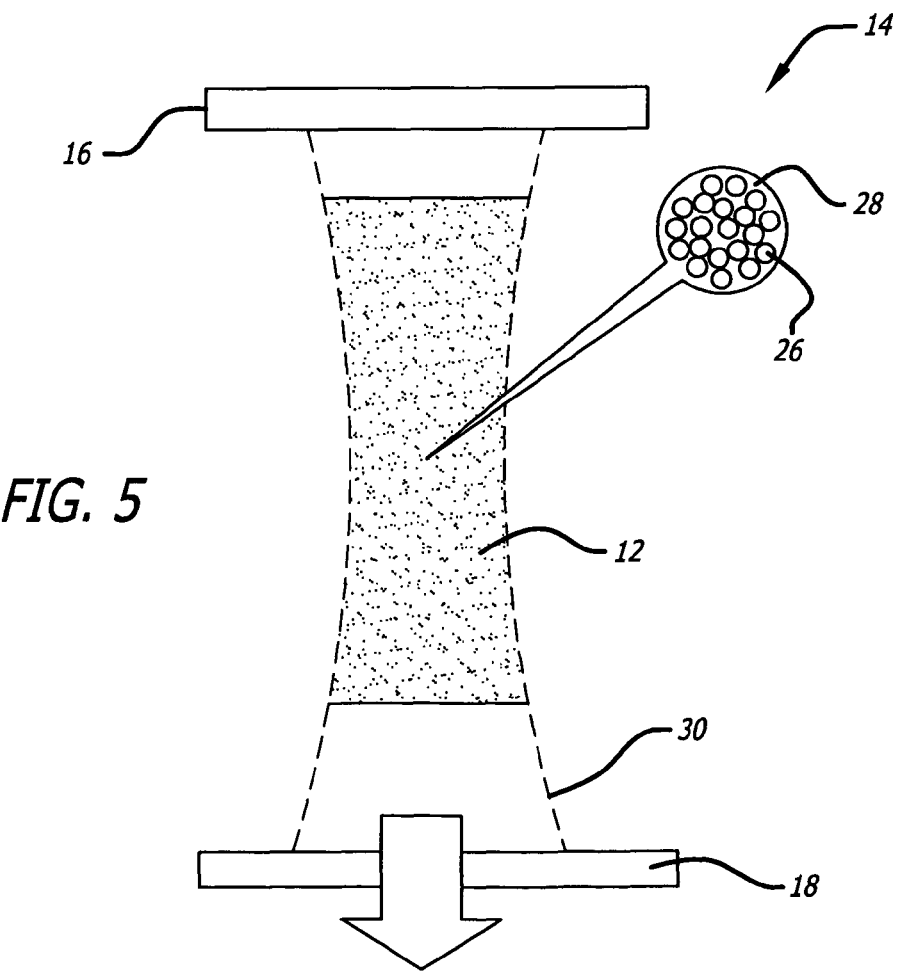
FIG. 5 is a top view of the resonator region of a laser designed in accordance with the teachings of the present invention.

FIG. 5 is a top view of the resonator region 14 of a laser 10' designed in accordance with the teachings of the present invention. As shown, the lasing volume 12 can be shaped via a geometrical shaped resonator chamber 14 (as formed by the walls of the container 30) for better matching to resonator modes for optimized energy extraction. An added advantage of the lasing volume shaping is reduction in ASE (amplified spontaneous emission) parasitic losses.

Figure 6:
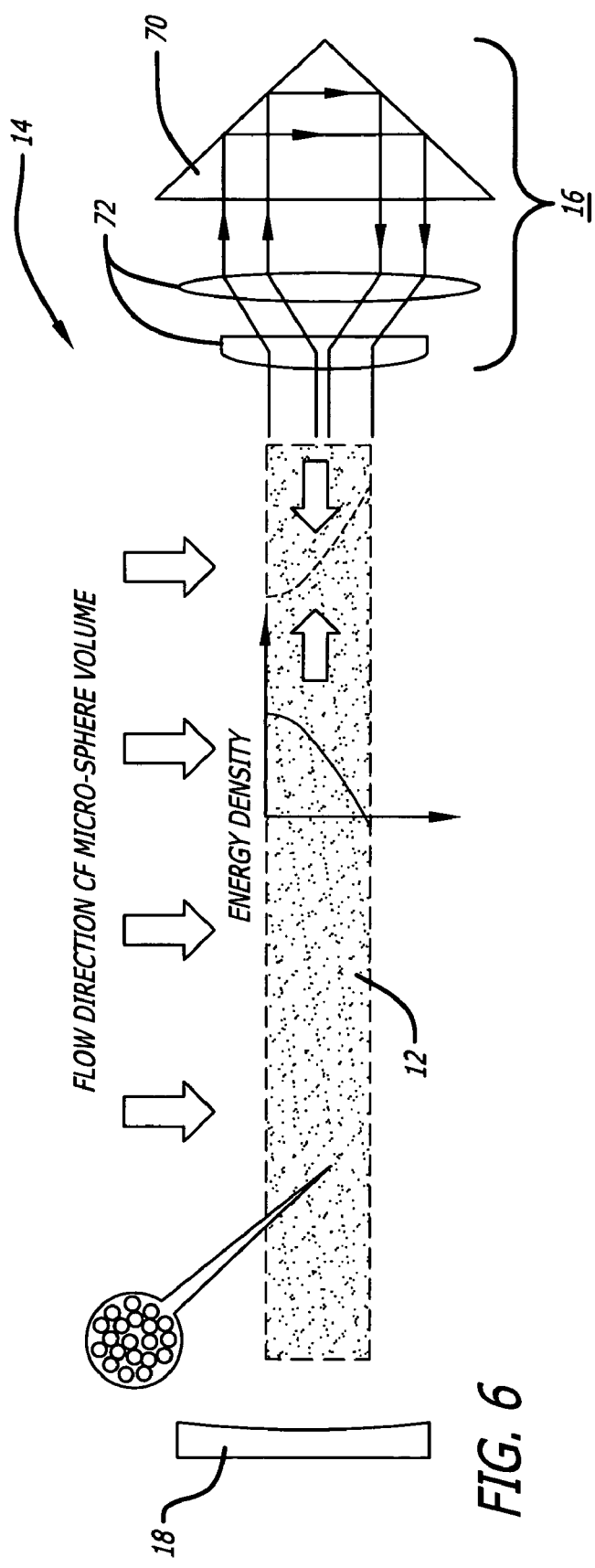
FIG. 6 is a side view of a resonator with a flipped resonator design for a laser designed in accordance with the teachings of the present invention.

In addition, various image rotating techniques can be implemented to compensate for gain non-uniformity across the cross-flow direction. Non-uniform gain cross-section compensation techniques are known in the art for high-energy gas dynamic lasers and other high power lasers. These techniques can be applied to the present invention. An example is illustrated in FIG. 6. FIG. 6 is a side view of a resonator 14 with a flipped resonator design for a laser 10' designed in accordance with the teachings of the present invention. In the example, the resonator mirror 16 is a folding mirror comprised of a roof prism 70 (coupled with lenses 72 for spreading the laser beam). As shown, the stored energy density of the laser is higher at the top of the resonator chamber 14 and lower towards the bottom. To compensate for this, the roof prism 70 is adapted to reflect the laser energy such that a beam from near the top of the resonator 14 is returned near the bottom of the resonator 14, thus improving the overall uniformity of the laser output from the output coupler 18.

With a laser designed in accordance with the present teachings, a high optical quality active medium (gain and refractive index uniformity) can be achieved by optimizing the geometry and velocity of the flow, gain particle size, fluid-to-particle refractive index match, etc. This assures the possibility of the generation of a near diffraction limited laser output beam.

Figure 7:
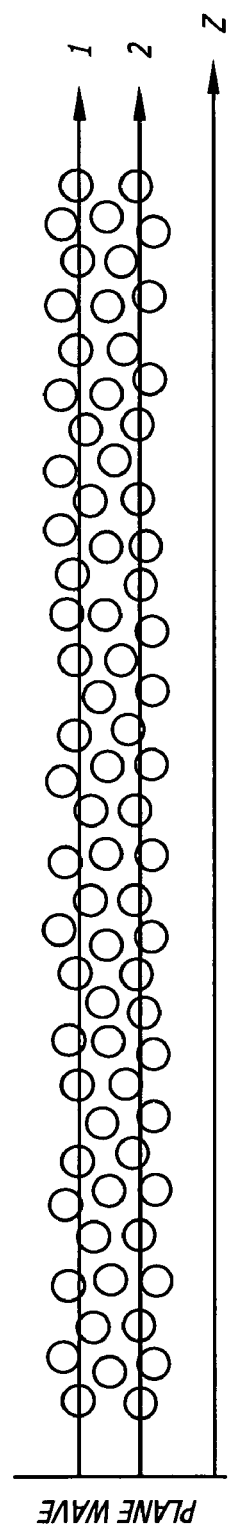
FIG. 7 is an illustration showing two different optical rays passing through a solid-state suspension medium designed in accordance with the present teachings.

An analysis follows on how particle size, gain, and refractive index mismatch may impact laser beam quality. For this, the distortions in intensity and phase distribution that a laser beam may experience after propagating through an amplifying medium such as a transparent liquid with suspended gain carrying micro-spheres are estimated. FIG. 7 is an illustration showing two different optical rays passing through a solid-state suspension medium designed in accordance with the present teachings. Assume that an incident beam, passing along the Z-axis as shown in FIG. 7, is a plane wave with initial uniform intensity and flat phase. Micro-spheres of diameter "d" have a local gain "g". A refractive index mismatch between the micro-sphere gain particles and the surrounding transparent liquid is "Δn". The relative volume density of micro-spheres in the liquid is "ρ".

Different optical rays, such as rays 1 and 2 as shown in FIG. 7, may accumulate different gains and different optical paths (that is, different phases) due to the different number of particles they cross while traveling along the Z-axis through the total length of the amplifier "L". Let $N_1$ and $N_2$ be the numbers of particles the beams 1 and 2 travel through, respectively. The resulting gain values (this is the total gain after passing through the total amplifier length L) will be $G_1 = \exp(N_1 M_d)$ and $G_2 = \exp(N_2 M_d)$, respectively. Here, $M_d =$ gd is the exponential gain per one particle. Different gains cause the laser intensities of rays 1 and 2 to be different, thus the amplified overall laser beam intensity will be non-uniform. Non-uniformity is characterized numerically by the ratio of gains: $G_1/G_2 = \exp[(N_1-N_2)M_d]$. Non-uniformity is small and does not cause substantial laser beam quality degradation if $G_1$ and $G_2$ are about equal, meaning $[(N_1-N_2)M_d] \ll 1$. A fluctuation, $\delta N = N_1 - N_2$, in the number of particles relates to the average number of particles $\overline{N}$: $\overline{(\delta N)^2} = \overline{N}$ for normal statistics. Thus, gain uniformity requires: $\sqrt{\overline{(\delta N)^2}} M_d \approx \sqrt{\overline{N}} M_d = \sqrt{\overline{M} M_d} \ll 1$, where $\overline{M} = \overline{N} M_d$ is the average total exponential gain, $\overline{M} = \ln \overline{G}$, corresponding to the average total gain of the amplifier: $\overline{G} = \exp(\overline{M})$. Since $M_d$ can be expressed as $M_d = \overline{M}/$ $\overline{N}$, the gain uniformity requirement can be expressed as $\sqrt{\overline{N}} \gg \overline{M}$, or $\overline{N} \gg \overline{M}^2$. This leads to an estimate of the minimum average number of particles required along the amplifier length based on a specified gain of the amplifier. Because the average number of particles relates to the parameters length L, size d, and density ρ, as: $\overline{N}=(L^3\sqrt{(6/\pi)\rho})/d$, an estimated limit for the diameter, d, is given by:

$$d \gg (L^3\sqrt{(6/\pi)\rho})/\overline{M}^2 \quad [4]$$

As a numerical example, let L=1000 mm, ρ~0.3, and $\overline{M}$~3 ($\overline{G}$≈20). This gives a very relaxed and easy to realize requirement for the micro-sphere diameter: d≪75 mm.

Next, a requirement for refractive index mismatch is estimated in order to sustain a near uniform/flat phase of the amplified laser beam after passing through the amplifier. The difference in optical path or phase, $\delta\phi = \phi_1 - \phi_2$ between rays 1 and 2 is expressed as:

$$\delta\phi = \phi_1 - \phi_2 = (2\pi/\lambda)\Delta nd(N_1 - N_2) = (2\pi/\lambda)\Delta nd\delta N \quad [5]$$

where λ is the laser wavelength. Again, the fluctuation of the number of particles $(\delta N)^2 = \overline{N}$, so the estimate for the phase fluctuations (or non-uniformity) can be expressed as:

$$\sqrt{\overline{(\delta\phi)^2}} = \sqrt{\phi_d^2 \overline{(\delta N)^2}} = \sqrt{\phi_d^2 \overline{N}}, \text{ where } \phi_d = (2\pi/\lambda)\Delta nd.$$

Small phase fluctuations lead to almost flat or uniform phase of the amplified laser beam, assuring good beam quality:

$$\sqrt{\overline{(\delta\phi)^2}} \ll \pi, \text{ or } \phi_d\sqrt{\overline{N}} \ll \pi \quad [6]$$

Using $\overline{N}=(L^3\sqrt{(6/\pi)\rho})/d$, the limit for particle diameter versus refractive index mismatch and other parameters is given by:

$$d < (\lambda/2\Delta n)^2/(L^3\sqrt{(6/\pi)\rho}) \quad [7]$$

The smaller the particle diameter, the larger refractive index mismatch can be tolerated. As an example, let λ·1.5 L~1000 mm, ρ~0.3, and Δn~$10^{-4}$. This results in the estimated requirement: d<80 μm. The same example but with Δn~$10^{-3}$ leads to d<0.8 μm.

Thus, the novel laser of the present invention is based on a lasing medium comprised of a plurality of solid-state gain particles (micro-spheres, in an illustrative embodiment) suspended in a fluid host that doubles as the dynamic transport medium and cooling interface. This approach features an inherently high surface to volume ratio (even higher than in a fiber laser) for efficient waste heat extraction. The index-matched fluid suspension allows for efficient transport into a mode-matched laser resonator chamber for optimized efficiency, and takes advantage of fluid-state dynamic heat extraction and exchange mechanisms for waste heat extraction (removing the need for complex jet-impingement coolers for solid-state slabs, which required additional cumbersome liquid handling heat exchange systems). In addition, the laser system of the present invention takes full advantage of inherently efficient diode-pumped solid-state laser action with a simple electrical to laser photon conversion laser mechanism. This approach provides for a venue to drastically improve (increase) output power (Watts) per kg so as to allow weapon class lasers to be deployed on a variety of airborne platforms. The use of small gain carrying particles eliminates the need for complex fabrication of large size laser active media.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A method for generating laser energy comprising:
   forming a gain medium comprising a plurality of solid-state gain particles suspended in a fluid;
   containing part of said gain medium in one or more pump modules for optical excitation;
   optically exciting said gain particles with a pump source configured to provide and direct optical energy into said one or more pump modules;
   flowing said gain medium from said pump module to a resonator, wherein said pump module is located outside of said resonator, and wherein said flowing is at a controlled flow velocity such that a mean transit time of said gain particles to travel through said pump module and to and through said resonator is less than a fluorescence lifetime of said gain particles; and
   extracting laser energy from said gain medium in said resonator.

2. The invention of claim 1 wherein said method further includes choosing a length of said resonator in a cross-flow direction in order to achieve a desired transit time.

3. The invention of claim 1 wherein said method further includes shaping said resonator in order to optimize energy extraction efficiency.

4. The invention of claim 3 wherein said method further includes shaping said one or more pump modules for optimal absorption efficiency during optical excitation.

5. The invention of claim 1 wherein said method further includes adjusting a density of said gain particles in said resonator in order to optimize energy extraction efficiency.

6. The invention of claim 5 wherein said method further includes adjusting a density of said gain particles in said pump module in order to optimize absorption efficiency.

7. The invention of claim 1 wherein said controlled flow velocity of said gain medium through said pump module is configured for optimal absorption.

8. The invention of claim 7 wherein said controlled flow velocity of said gain medium through said resonator is configured for optimal extraction.

* * * * *